United States Patent [19]

Hsu

[11] Patent Number: 5,047,991

[45] Date of Patent: Sep. 10, 1991

[54] LITHOLOGY IDENTIFICATION USING SONIC DATA

[75] Inventor: Kai Hsu, Danbury, Conn.

[73] Assignee: Schlumberger Technology Corporation, New York, N.Y.

[21] Appl. No.: 526,419

[22] Filed: May 21, 1990

Related U.S. Application Data

[62] Division of Ser. No. 345,510, Apr. 28, 1989, Pat. No. 4,951,266.

[51] Int. Cl.$^5$ .......................... G01V 1/30; G01V 1/40
[52] U.S. Cl. .......................... 367/25; 367/74; 364/421; 364/422
[58] Field of Search ..................... 367/38, 59, 73, 25; 364/421, 422

[56] References Cited

U.S. PATENT DOCUMENTS 4,779,237 10/1988 Bodine .................................. 367/47

OTHER PUBLICATIONS

Andres, H. C., et al., "Outer Product Expansions and Their Uses in Digital Image Processing", IEEE Transactions on Computers, vol. c.-25, No. 2, pp. 140-148 (Feb. 1976).

Gerbrands, J. J., "On the Relationships Between SVD, KLT, and PCA", Pattern Recognition, vol. 14, Nos. 1-6, pp. 375-381 (1981).

Kramer, H. P. et al., "A Linear Coding for Transmitting a Set of Correlated Signals", IRE Trans. Inform. Theory, vol. 2, pp. 41-46 (1956).

Cliet, C., et al., "Pattern Recognition: An Application to Wave Separation in Three-Component Offset VSP", Presented at the 56th Annual Mtg. of Soc. of Exploration, Geophysics, Houston, pp. 308-310 (1986).

Done, W. J. et al., "Coherent Noise Suppression in Seismic Data Using Eigenvalue/Eigenvector Decomposition", Proc. of 1988 Intern. Conf. Acoust. Speech, Signal Processing, pp. 908-11 (1988).

Freire, S. L. M., et al. "Application of Singular Value Decomposition to Vertical Seismic Profiling", Geophysics, vol. 53, No. 6, pp. 778-785 (Jun. 1988).

(List continued on next page.)

Primary Examiner—Ian J. Lobo
Attorney, Agent, or Firm—David P. Gordon; Leonard W. Pojunas; Marc D. Foodman

[57] ABSTRACT

A method of identifying lithology of a formation traversed by a borehole from which sonic data is acquired is disclosed. The sonic data acquired comprises a data set of m waveforms, each of the waveforms including a formation wave component digitized into n samples. The formation wave component comprises direct wave components and typically reflected wave components, converted wave components, and noise. A preferred lithology identification method comprising the steps of characterizing the n samples of each formation wave component as a vector, obtaining a first eigenvector based on the formation wave component vectors, selecting a formation wave component vector, calculating a projection of the selected wave component vector on the first eigenvector, and identifying the lithology of the formation through which the selected wave component passed based on the projection of the selected wave component vector on the first eigenvector. If desired, more than one eigenvector may be obtained, and the selected formation wave component vector can be projected on the more than one eigenvectors to identify lithology. Lithology is identified due to the fact that the projection of wave components traveling through a formation of certain lithology will tend to congregate; i.e. their amplitudes along an axis or along several axes will be similar for a given lithology.

20 Claims, 12 Drawing Sheets

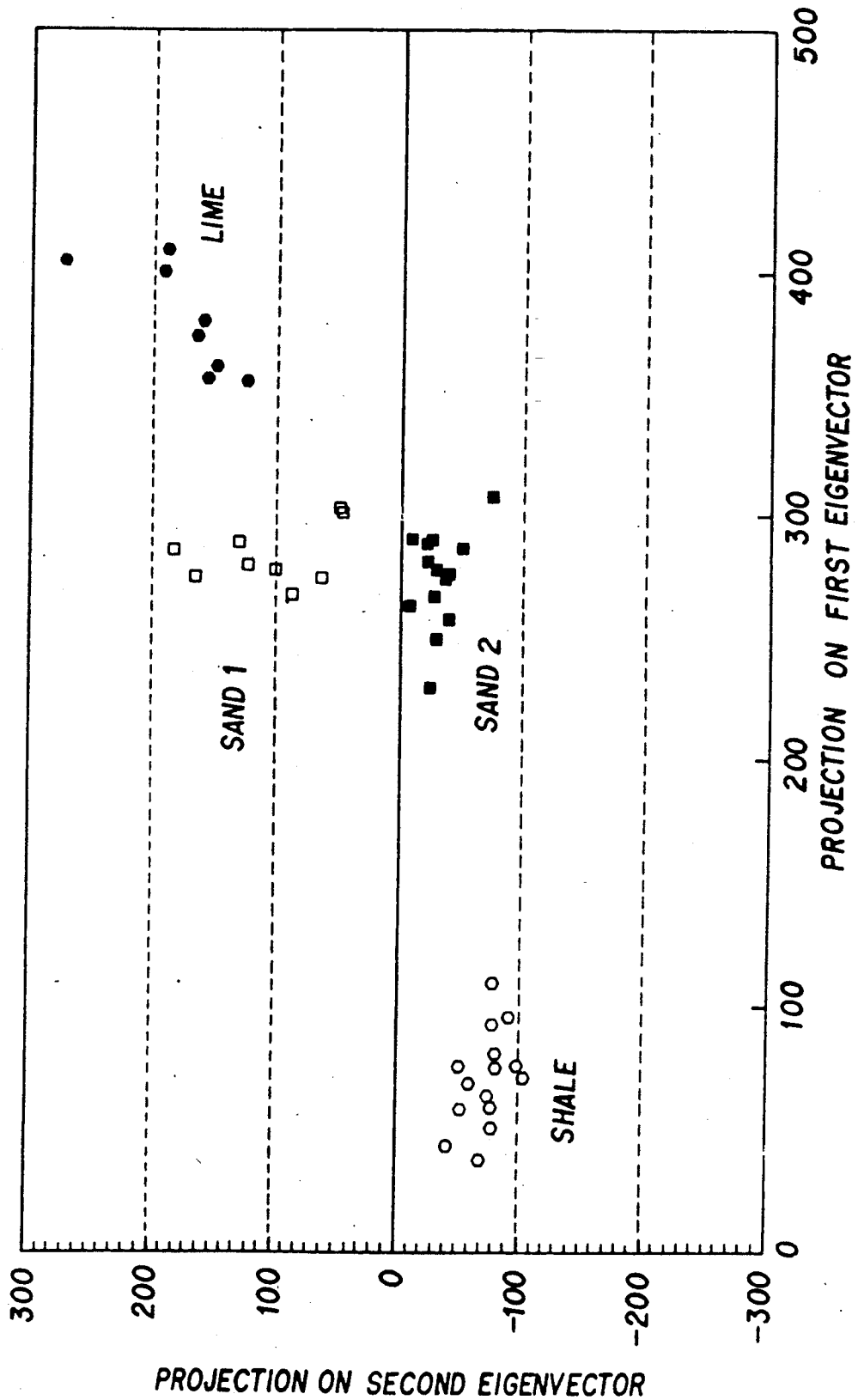

LITHOLOGY IDENTIFICATION USING SONIC DATA

This application is a division of U.S. patent application Ser. No. 345,510, filed Apr. 28, 1989, now U.S. Pat. No. 4,951,266.

BACKGROUND OF THE INVENTION

1. Technical Field

The present invention is directed to filtering well logging data. More particularly, the present invention is directed to filtering out unwanted components contained in acquired sonic well logging data, e.g., reflected wave components, converted wave components, casing arrivals, tool arrivals and/or noise.

The present invention is further directed to estimating a reflection coefficient of a bed boundary in the formation, identifying the lithology of the formation traversing the borehole, and compressing the sonic data, based on the acquired sonic data.

2. Background Information

Turning now to FIG. 1, a schematic diagram of a logging operation is shown. Tool, or sonde, 10 for acquiring sonic data is located in borehole 11 penetrating earth formation 12. Optionally, the borehole wall may have casing 13 cemented thereto, e.g., in a production well. The sonde is preferably lowered in the borehole by armored multiconductor cable 14 and slowly raised by surface equipment 15 over sheave wheel 16 while sonic data measurements are recorded. The depth of the tool is measured by depth gauge 17, which measures cable displacement.

Sonde 10 acquires sonic data by emitting an acoustic pulse and recording its return waveform. The sonde comprises at least one sonic source, or transmitter, and at least one detector, or receiver. The source typically produces a pulse upon excitation. The pulse travels through the casing and formation, and back to the sonde where it is detected by the receiver(s) thereon. The return waveforms can be analyzed by the sonde in situ, analyzed by data processor 18 at the surface, or stored, either in the sonde or at the site, for analysis at a remote location. In the preferred embodiment, the return waveform data is transferred to data processor 18 by cable 14 for analysis at a remote location.

Sonic data acquired in this manner is typically displayed on a chart, or log, of waveform amplitude over time versus depth. With reference to FIG. 2, a representation of sonic data in log format is shown. The data was recorded at 200 seccessive depth locations, the depth interval consisting of various formations, ranging from very hard limestone to very soft shaley sand.

Ideally, the waveform data records the arrival of compressional (P) waves, shear (S) waves and Stoneley (ST) waves. However, the P,S and/or ST wave components often contain undesirable components which degrade and/or mask the desired wave components. Examples of undesirable components include reflected and/or converted waves, casing arrivals, tool arrivals and noise.

The P,S and/or ST wave components are often contaminated by reflected and/or converted waves when the receiver is close to a bed boundary. Reflected waves are waves which are emitted by the source as P,S or ST waves, reflected by bed boundaries, and received as P,S or ST waves, respectively. Converted waves, on the other hand, are waves which are emitted by the source as P,S or ST waves, reflected by bed boundaries, and received as something other than P,S or ST waves, respectively. For example, a P wave which is "converted" to an S wave, and so recorded, is a converted wave.

Several examples of reflected and converted waves are marked at A through I in FIG. 2. As can be seen in FIG. 2, the reflected and converted waves occur at the same time as the desired waveform arrivals. Additionally, the frequency content to the reflected and converted waves overlaps that of the P,S and/or St wave components.

Aside from P,S and ST wave component arrivals from the formation, the acoustic pulse travels through the steel casing, as well as the tool itself. The waveforms therefrom are commonly referred to as casing and tool arrivals, respectively. The point in time at which a waveform component arrives and is subsequently detected by the sonde's receiver(s) is commonly referred to as the waveform component's arrival time.

A steel casing is typically cemented to the borehole wall in production wells. As is well known, the cemented casing isolates the various water, gas and oil bearing zones from each other, thereby maintaining zone integrity. When the cement bond is good, the casing is substantially transparent to the sonic tool. Thus, the sonic tool is capable of logging through the casing and acquiring the formation wave components. However, when the cement bond is deficient or deteriorated, a strong wave travels through the casing, subsequently detected by the receiver(s). The casing arrival can mask the formation arrivals which have a smaller amplitude.

The tool itself also provides a path from transmitter to receiver. The tool's arrival time can appear at the same time as the formation arrival, based on tool design. Further, the amplitude of the tool arrival can be several times that of the formation arrival. As a result, the formation wave is masked by the tool arrival. As appreciated by those skilled in the art, the formation wave is desired for many reasons, e.g., to calculate the formation slowness.

Additionally, the recorded waveforms are likely to be contaminated by noise, e.g., geological, external, electronic and/or quantization. Geological noise is generated by the formation, e.g., from fracture development. External noise is due to interference from external sources, e.g., road traffic, rig activity and the like. Electronic noise is produced by the electronic components of the sonde, e.g., due to component reaction to thermal fluctuations, cross-talk or shot-noise. Quantization noise is the result of waveform degradation inherent in digitizing an analog signal, such as the waveforms acquired by the sonic detectors. Since noise tends to degrade and mask the acquired data, noise is undesirable.

Numerous filtering techniques are known for removing undesired components from waveforms. For example, the waveform can be filtered in either the temporal or the spectral domain. Such techniques, however, cannot be applied to sonic data to remove undesired components caused by reflected and/or converted waves, casing arrivals, tool arrivals and/or noise. In order for temporal or spectral filtering to be effective, there must exist a time or frequency separation, respectively, between the desired and undesired components. Such separation does not exist between the desired and undesired components in the acquired waveform.

Additionally, the waveforms can be filtered using velocity filtering techniques. Reflected waveforms appear at a receiver after the direct waveform, typically having similar frequency characteristics, albeit different velocities (i.e., arrival times). In order to separate the two, a velocity filter is employed which separates arrivals based on their different velocities.

However, velocity filtering does not filter out noise components. Additionally, conventional filtering techniques do not allow the identification of lithology, let along allow for data compression.

SUMMARY OF THE INVENTION

Accordingly, it is an object of the present invention to substantially filter out undesired components, e.g., reflected wave components, converted wave components, noise, casing arrivals, and/or tool arrivals from acquired sonic data.

It is also an object of the present invention to estimate a reflection coefficient of a bed boundary in the formation for at least one wave component of the acquired sonic data.

It is a further object of the present invention to identify the lithology of the formation traversing the borehole from which the sonic data was acquired.

It is yet a further object of the present invention to compress the acquired sonic data.

One aspect of the present invention is directed to the removal of undesired components from acquired sonic data. Examples of undesired components therein include reflected wave components, converted wave components, noise casing arrivals, and/or tool arrivals. A first embodiment of the present invention employs a Karhunen-Loeve transform. A second embodiment of the present invention employs an approximation of the Karhunen-Loeve transform.

Sonic data is recorded downhole, typically in digital format, by any conventional technique well known in the art. The acquired data set comprises a plurality of waveforms, each having compressional (P), shear (S) and/or Stoneley (ST) wave components. These components are operated upon individually by the method of the present invention. In the preferred embodiment, the P,ST and then the S wave components are filtered.

In order to remove reflected wave components, converted wave components and/or noise, the position of the P wave component's arrival time for each waveform in the data set is detected. Based on this information, the P wave component is isolated from the rest of the waveform by a time window, predetermined to capture the entire P wave component.

In the first embodiment, the n digitized samples of each P wave component are treated as an n-dimensional vector. These vectors can be plotted mathematically in an n-dimensional space. Given the similar nature of P wave components, the vectors will have a substantially similar primary direction. Fluctuation about and projection on this primary direction is a function of the formation composition traversed by the borehole, as well as undesired components recorded in the waveforms.

Karhunen-Loeve rotates the coordinate system of the n-dimensional space to a new coordinate system whose directions, characterized as eigenvectors, are aligned with the primary directions of the wave component vectors. The eigenvectors are ordered such that the first eigenvector represents the wave component's main direction, the second eigenvector represents the wave component's next main direction, et cetera. By projecting the waveforms onto the principle eigenvectors, the reflected wave components, converted wave components and/or noise component of each waveform is substantially eliminated.

In the second embodiment, an alternative method is employed for removing reflected wave components, converted wave components and/or noise. The n samples of each P wave component are averaged to obtain a template of the P wave components. The template is normalized, and this normalized template closely approximates the first eigenvector discussed above. An approximation to the second eigenvector is preferably obtained by taking the Hilbert transform of the normalized template.

Theoretically, there are n eigenvectors, corresponding to the original n-dimensional space. Practically, however, given the similar nature of the P,S and ST wave components, fluctuation about the first eigenvector is substantially limited. I have found that only the first few eigenvectors are needed to substantially describe the position of the wave component vectors. Thus, using only the first eigenvector, or an approximation thereof, about 86% of the wave components are captured. Using the first and second eigenvectors, or approximations thereof, about 92% of the wave components are captured; using the first three, about 96%.

In both embodiments, the first eigenvector, or its approximation, is correlated to the individual wave component, e.g., P, for each waveform, thereby obtaining a correlation factor. Multiplying the correlation factor by the first eigenvector, or its approximation, yields a correlated eigenvector. This correlated eigenvector is subtracted from the wave component. The residual wave component includes undesired components, e.g., reflected wave components, converted wave components, and/or noise, as well as residual wave components. In order to reduce the amount of wave component in the residual waveform, the second eigenvector, or its approximation, is correlated to the residual waveform and subtracted therefrom. This correlation/subtraction process can continue for all subsequent eigenvectors, based on desired resolution.

The residual waveform contains the undesired components, such as reflected waves, converted waves, and/or noise. This residual P wave component waveform is subtracted from the acquired (original) wave component waveform, thereby producing wave components substantially free of these undesired components. This method, repeated for all wave components, thereby produces better slowness logs.

In order to remove the undesired components of tool arrivals and casing arrivals, the tool arrival (casing arrival) is detected, and its first eigenvector, or its approximation, is determined. A correlation factor is calculated and multiplied by the first eigenvector, or its approximation, yielding a correlated first eigenvector. The correlated first eigenvector is subtracted from the waveform. Optionally, these steps may be repeated a plurality of times to account for the second through nth eigenvectors. Due to the consistent nature of the tool arrival (casing arrival), once subtraction has occurred, the remaining waveform is substantially free of tool arrivals (casing arrivals). In the preferred embodiment, two eigenvectors, or their equivalent, are employed for removing casing arrivals, and one eigenvector, or its equivalent, is preferably employed for removing tool arrivals.

In the preferred embodiment, the tool and casing arrivals are removed prior to removal of the other undesired components from the acquired waveforms.

In another aspect of the present invention, the reflection coefficient of a bed boundary in the formation can be estimated for each wave component, once the wave components are substantially free of the above-mentioned undesired components. The energy content of the reflected wave component can be obtained from the residual waveform. The energy content of the transmitted wave component can be obtained from the filtered wave component. The reflection coefficients is estimated by dividing the energy content of the reflected wave component by the energy content of the transmitted wave component.

In a further aspect of the present invention, the lithology of the formation traversing the borehole can also be identified. The P wave component, for example, can be expressed in a two-dimensional Karhunen-Loeve plane. The plane's abscissa (x-axis) is preferably the projection of the respective P wave component on the first eigenvector (obtained from the above-calculated factor correlating the P wave component vector to the first eigenvector or its approximation). The plane's ordinate (y-axis) preferably the projection of the respective P wave component on the second eigenvector (obtained from the above-calculated factor correlating the P wave component vector to the second eigenvector or its approximation).

These points are then plotted in the Karhunen-Loeve plane. I have found that these points tend to cluster based on lithology type. For example, points obtained from wave components traveling through limestone tend to congregate in one area of the plane, while points obtained from wave components traveling through shaley sand ten to congregate in another area.

Given a plurality of wave components depicted in this manner, a database can be established for identifying the lithology of the formation traversing the borehole given its coordinates in the Karhunen-Loeve plane. Given the database and the waveform's eigenvectors, the lithology of the formation through which the wave traveled can be identified.

In yet further aspect of the present invention, the data set can also be compressed, employing the eigenvectors. Recalling that Karhunen-Loeve rotates the n-dimensional coordinate system to a new coordinate system, the wave component vectors can be expressed in terms of the primary eigenvectors. For example, if the 4th through 50th eigenvalues are substantially equal to zero, each wave component vector can substantially be described using only their projection on the first three eigenvectors.

BRIEF DESCRIPTION OF THE DRAWINGS

FIG. 11 illustrates the identification of formation lithology based on a plane formed from the projections of the P wave components on the first and second eigenvectors.

DESCRIPTION OF THE PREFERRED EMBODIMENT(S)

Figure 3A:
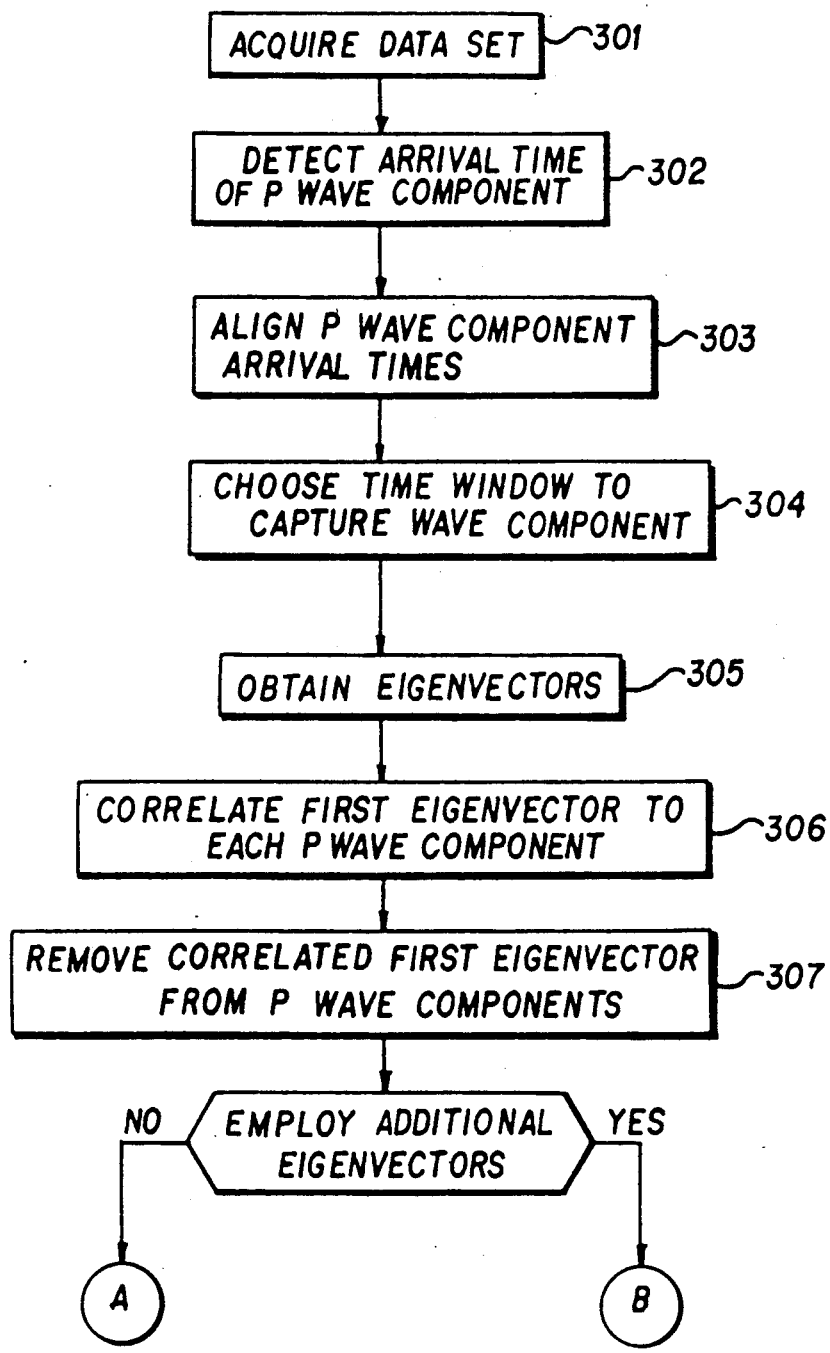
FIGS. 3a and 3b illustrate a first embodiment of the present invention for substantially removing reflected wave components, converted wave components and/or noise from acquired sonic data empolying a Karhunen-Loeve transformation.
Figure 3B:
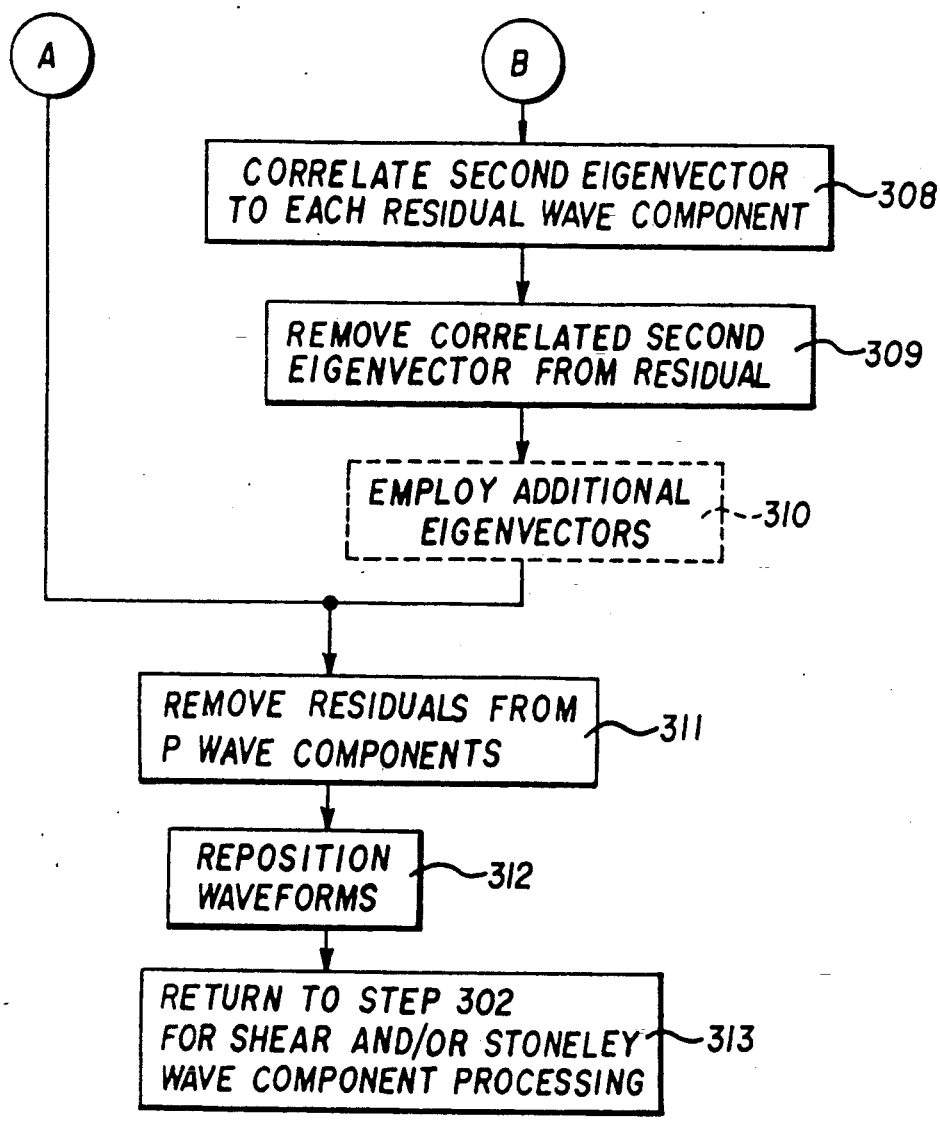

Turning now to FIGS. 3a and 3b, the first embodiment of the method of the present invention for substantially removing reflected wave components, converted wave components and/or noise from acquired sonic data employing a Karhunen-Loeve transformation is described.

Figure 1:
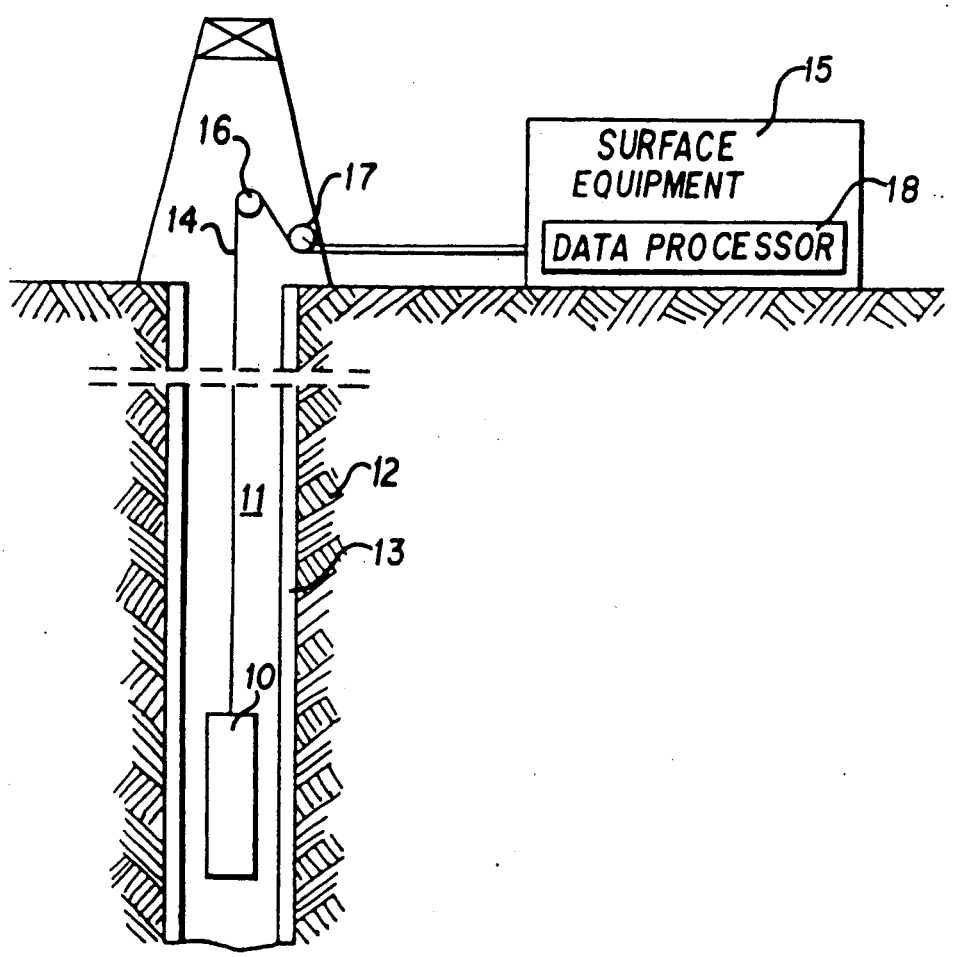
FIG. 1 illustrates a schematic diagram of a logging operation.
Figure 2:
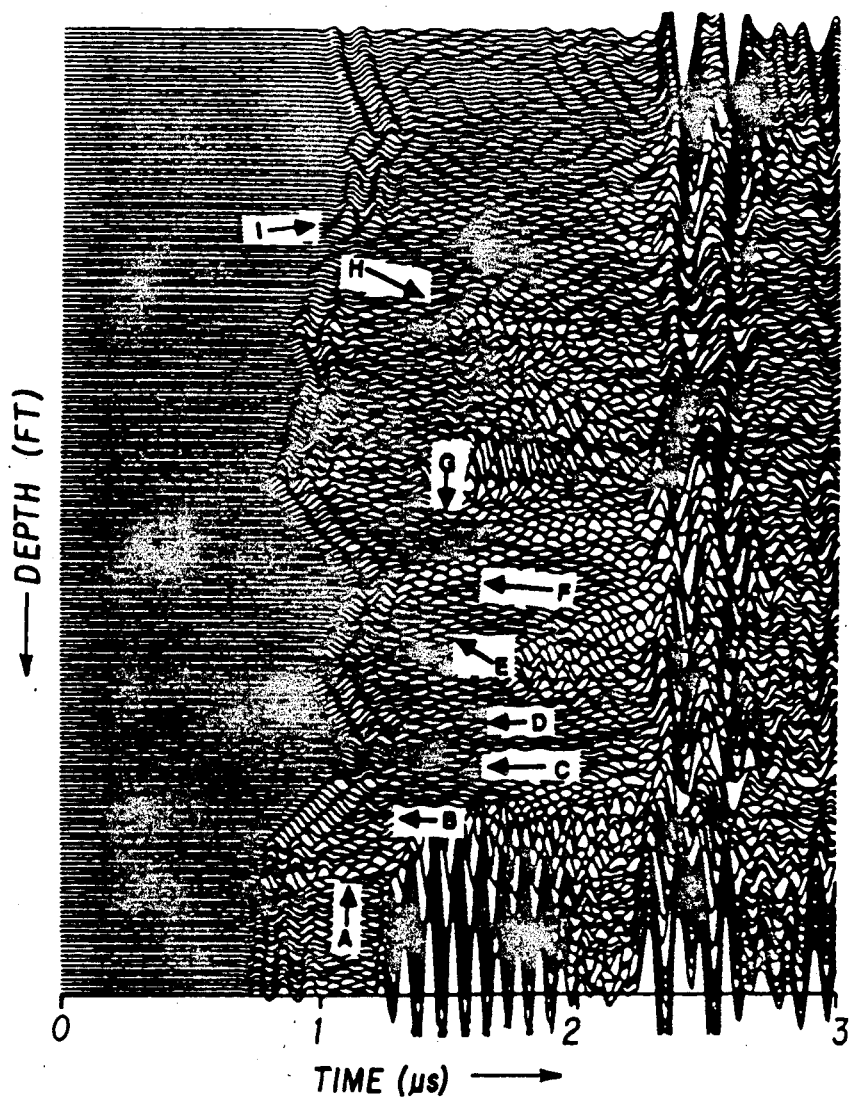
FIG. 2 illustrates acquired sonic logging data in log format.

At step 301, the sonic data is acquired. In the preferred embodiment, the waveforms are digitized using a sampling rate of 10μs. Other sampling rates, depending upon desired accuracy and the Nyqurest criterion, will be obvious to one skilled in the art. Methods of acquiring sonic data are well known to those skilled in the art, for example, as shown with reference to FIG. 1. Sonic data is typically acquired from substantially the entire length of the borehole. The data set shown in FIG. 2 comprises 200 waveforms, each having P, S and ST wave components.

Preferably, a 500 microsecond (μs) time window is employed with a sampling rate of 10μs, thereby obtaining 50 sampled points for the P wave components of each waveform.

It is to be understood, however, that the dimensions of the data set used herein in for illustrative purposes only. Additionally, although the data set used herein includes P, S and ST wave components, it is to be understood that a sonic data set having any number of wave components can be used in conjunction with the present invention.

As described hereinbelow, the method of the present invention is applied to remove reflected wave components, converted wave components and/or noise, first on the P wave components, then on the S and/or ST wave components, in either order. Subsequently, the method of the present invention is applied to removed tool and casing arrivals. In the preferred embodiment, however, the tool and casing arrivals are removed first, followed by the removal of the reflected wave components, converted wave components and/or noise, first on the P wave components, then on the S and/or ST wave components, in either order. Other orders of operation, however, can be performed.

At step 302, the arrival time of each P wave component is detected. Due to the nonhomogeneity of the formation, the P wave component of each waveform arrives at a different time, relative to each other. In the preferred embodiment, a threshold detection scheme is applied to the waveforms to detect their respective arrival times. However, other arrival time detection schemes, e.g., a zero-crossing detector having an amplitude threshold requirement, can be empolyed.

Figure 4:
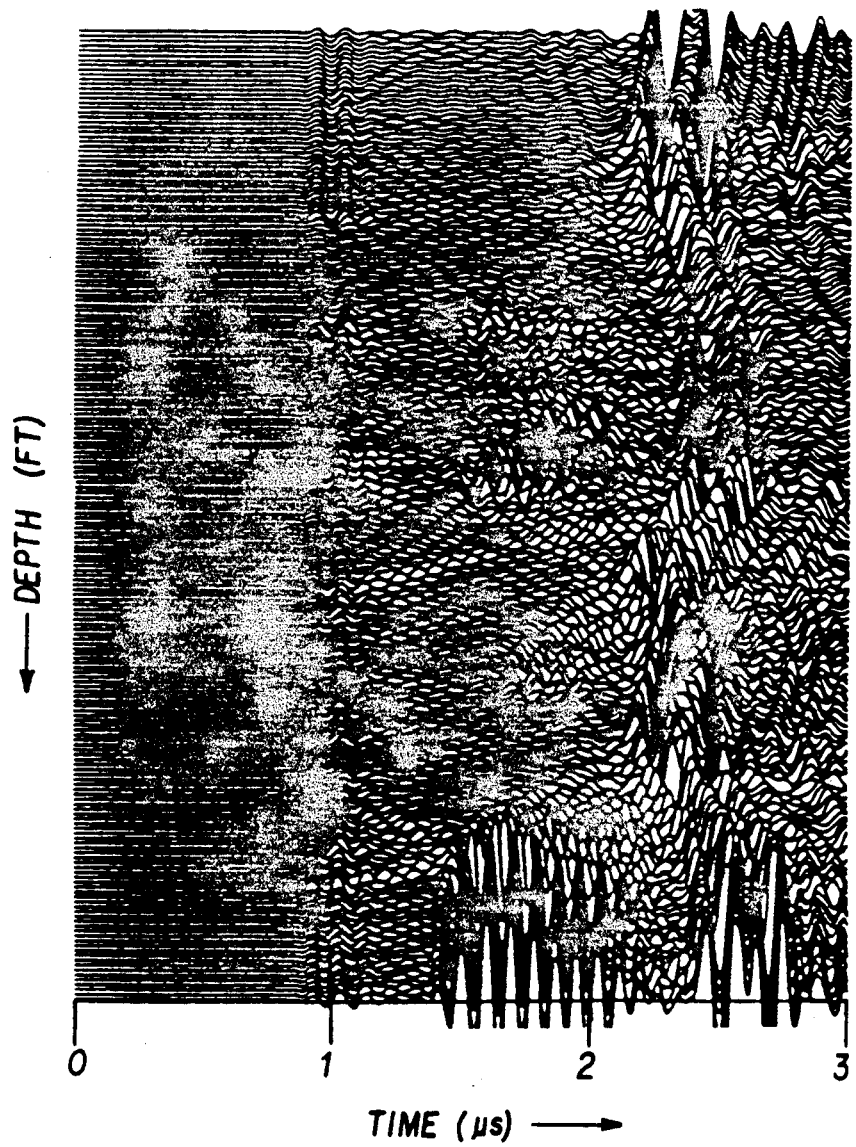
FIG. 4 shows the sonic data of FIG. 2 such that their respective P wave component arrival times are aligned.

At step 303, the waveforms are preferably time shifted such that their P wave component arrival times are aligned. Alignment of the P wave component arrival times is shown with reference to FIG. 4. Alternatively, the P wave components arrival times can be detected and stored for use in conjunction with the remaining steps described hereinafter, thereby eliminating the need to align the wave components.

At step 304, a time window is selected. Preferably, a 500 microsecond ($\mu$s) time window is empolyed. Given the sampling rate of 10$\mu$s, the window will contain 50 sampled points for the P wave components of each waveform.

The time window preferably captures the entire P wave component. The P wave component is typically 300 to 400 $\mu$s long. Additionally, the time window preferably commences 50$\mu$s before the detected P wave component arrival. This window position insures that the entire P wave component is captured for processing, as the P wave component's arrival time may be too small for detection and/or buried by noise. Thus, the time window of 500$\mu$s is preferably employed. Other time window values, either shorter or longer, can also be used.

At step 305, the eigenvectors are obtained. The n-samples of each P wave component can be represented as a P wave component vector in n-space. The Karhunen-Loeve transformation generates eigenvectors orthogonal to each other, derived from the statistics of the P wave component vectors. Eigenvectors are generated based on a correlation matrix, CM, defined by the following equation:

$$CM = \lim_{k \to \infty} \frac{1}{k} \left( \sum_{j=1}^{k} S_j S_j^T \right)$$

where
k represents the number of vectors in the data set;
$S_j$ represents the vector; and
$S_j^T$ represents the transpose of the vector.

The correlation matrix definition is based on the statistical characteristics of the vectors given an infinite data set. As the data set of sonic logging is limited to m waveforms, the correlation matrix is approximated by the following equation:

$$CM = \frac{1}{m} \left( \sum_{j=1}^{m} S_j S_j^T \right)$$

where
m represents the number of waveforms in the data set;
Sj represents the wave component vector; and
$S_j^T$ represents the transpose of the wave components vector.

Given the P wave component vectors, the correlation matrix CM is calculated. The eigenvectors are obtained from the correlation matrix acording to the following equation:

$$CM\Phi_i = \lambda \Phi_i$$

where
$\Phi_i$ represents the ith eigenvector; and
$\mu_i$ represents the ith scalar for the ith eigenvector.

The scalar for the ith eigenvector is commonly referred to as its eigenvalue. The eigenvalues are preferably ranked according to magnitude, the first eigenvalue being the largest. As discussed above, the first eigenvalue represents the average of the wave component vectors in the first eigenvector's direction. The second through mth eigenvalues represent the average variation of the wave component vectors in the second through mth eigenvector's direction, respectively.

In the preferred embodiment, the m eigenvectors are obtained using the IMSL software package, available from IMSL, Incorporated, Customer Relations, 2500 ParkWest Tower One, 2500 CityWest Boulevard, Houston, Tex., 77042-3020. However, other software packages are available and can be used for calculating the correlation matrix, the eigenvectors and their corresponding eigenvalues. As will be appreciated by those skilled in the art, the eigenvectors contain the same number of points as there are samples in the P wave component.

At step 306, the first eigenvector is correlated to each P wave component in the data set, thereby obtaining a correlation factor for each P wave component. In the preferred embodiment, the correlation factors are obtained by taking the inner product of the first eigenvector and each P wave component. The inner product is obtained by multiplying each first eigenvector point with each P wave component sample and cumulating the results to obtain a scalar value. Obtaining the correlation factor of the first eigenvector to the individual P wave components can be represented by the following equation:

$$a_j = \sum_{i=1}^{n} E_1(i)S(i)_j \text{ for } j = 1 \text{ to } m$$

where
aj represents the correlation factor for the jth waveform;
$E_1(i)$ represents the ith sample of the first eigenvector;
S(i)j represents the ith sample of the P wave components contained in the time window;
n represents the number of samples; and
m represents the number of waveforms contained in the data set.

At setp 307, a correlated first eigenvector is removed from its respective P wave components, preferably by subtraction. In the preferred embodiment, the correlated first eigenvector is obtained for each of the m waveforms by multiplying each of the first eigenvector points by the correlation factor. Removing the correlated first eigenvector from the individual P wave component for each waveform can be represented by the following equation:

$$S_R(i)_j = S(i)_j - a_j E_1(i) \text{ for } i=1 \text{ to } n; j=1 \text{ to } m$$

where $S_R(i)_j$ represents the ith sample of the residual samples in the time window for the jth waveform;

$S(i)_j$ represents the ith sample of the P wave component for the jth waveform;

$E_1(i)$ represents the ith sample of the first eigenvector;

n represents the number of samples; and m represents the number of waveforms in the data set.

Removing the correlated first eigenvector from the P wave component yields a residual for each of the waveforms. The residual comprises reflected wave components, converted wave components and noise, as well as a residual P wave component.

As stated above, the first eigenvector captures about 86% of the wave component. Should greater accuracy be desired, additional eigenvectors are employed, as set forth in steps 308 through 310. Otherwise, only steps 311 through 313 are followed.

At step 308, the second eigenvector is correlated to each residual wave component, preferably as discussed above with reference to step 306. Obtaining the correlation factor of the second eigenvector to each residual wave component can be represented by the following equation:

$$b_j = \sum_{i=1}^{n} E_2(i) S_R(i)_j \text{ for } j = 1 \text{ to } m$$

where $b_j$ represents the correlation factor for the jth waveform;

$E_2(i)$ represents the ith sample of the second eigenvector;

$S_R(i)_j$ represents the ith sample of the residual wave components for the jth waveform;

n represents the number of samples; and m represents the number of waveforms contained in the data set.

At step 309, the correlated second eigenvector is removed from its respective residual wave components, preferably as discussed above with reference to step 307. Removing the correlated second eigenvector from the respective residual wave components can be represented by the following equation:

$$S'_R(i)_j = S_R(i)_j - b_j E_2(i) \text{ for } i = 1 \text{ to } n; j = 1 \text{ to } m$$

where $S'_R(i)_j$ represents the ith sample of the second residual for the jth waveform;

$S_R(i)_j$ represents the ith sample of the first residual the jth waveform;

$E_2(i)$ represents the ith sample of the second eigenvector;

n represents the number of samples; and m represents the number of waveforms in the data set.

As stated above, the first and second eigenvectors capture about 92% of the wave component. Should greater accuracy be desired, additional eigenvectors may be employed at step 310. In the preferred embodiment, step 310 parallels steps 308 and 309, wherein the jth eigenvector is correlated to the (j−1)th residual wave component samples, and the correlated jth eigenvector is subtracted from the most recent residual wave component samples calculated.

At step 311, the residual wave components are removed from the aligned P wave components, preferably by subtraction. In this case where only the first eigenvector was employed (to step 307), the P wave components are about 86% free of undesired wave components. In this case, removing the residual wave components from the aligned P wave components for each waveform can be represented by the following equation:

$$S_c(i)_j = S_R(i)_j \text{ for } i = 1 \text{ to } n; j = 1 \text{ to } m$$

where $S_c(i)_j$ represents the ith sample of the jth wave component substantially free of reflected wave components, converted wave components and/or noise;

$S(i)_j$ represents the ith sample of the jth wave component;

$S_R(i)_j$ represents the ith sample of the jth residual wave component;

n represents the number of samples; and m represents the number of waveforms.

In the case where the first and second eigenvectors were employed (to step 309), the P wave components are about 92% free of undesired wave components. In this case, removing the residual wave components from the aligned P wave components for each waveform can be represented by the following equation:

$$S_c(i)_j = S(i)_j - S'_R(i)_j \text{ for } i = 1 \text{ to } n; j = 1 \text{ to } m$$

where $S_c(i)_j$ represents the ith sample of the jth wave component substantially free of reflected wave components, converted wave components and/or noise;

$S(i)_j$ represents the ith sample of the jth wave component;

$S'_R(i)_j$ represents the ith sample of the jth residual wave component;

n represents the number of samples; and m represents the number of waveforms.

Figure 5:
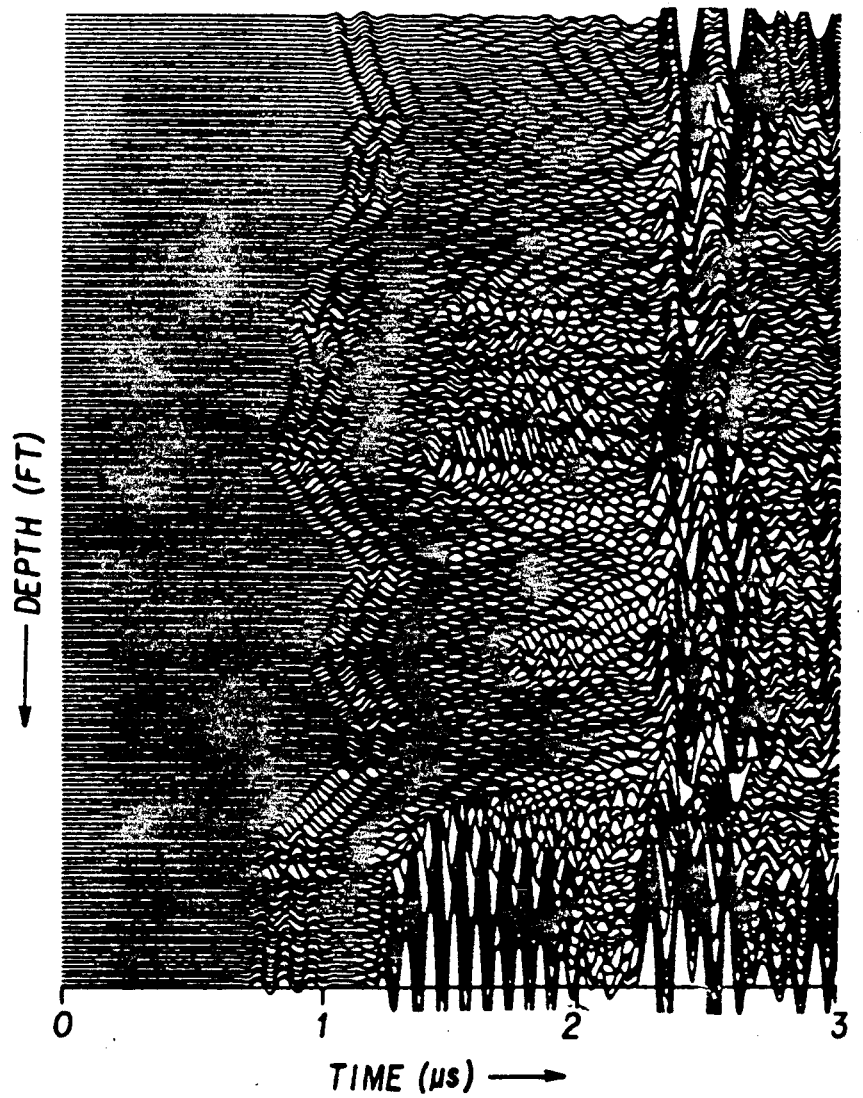
FIG. 5 shows the sonic data of FIG. 2 wherein the reflected wave components, converted wave components and/or noise, calculated from the first eigenvector, are removed therefrom.
Figure 6:
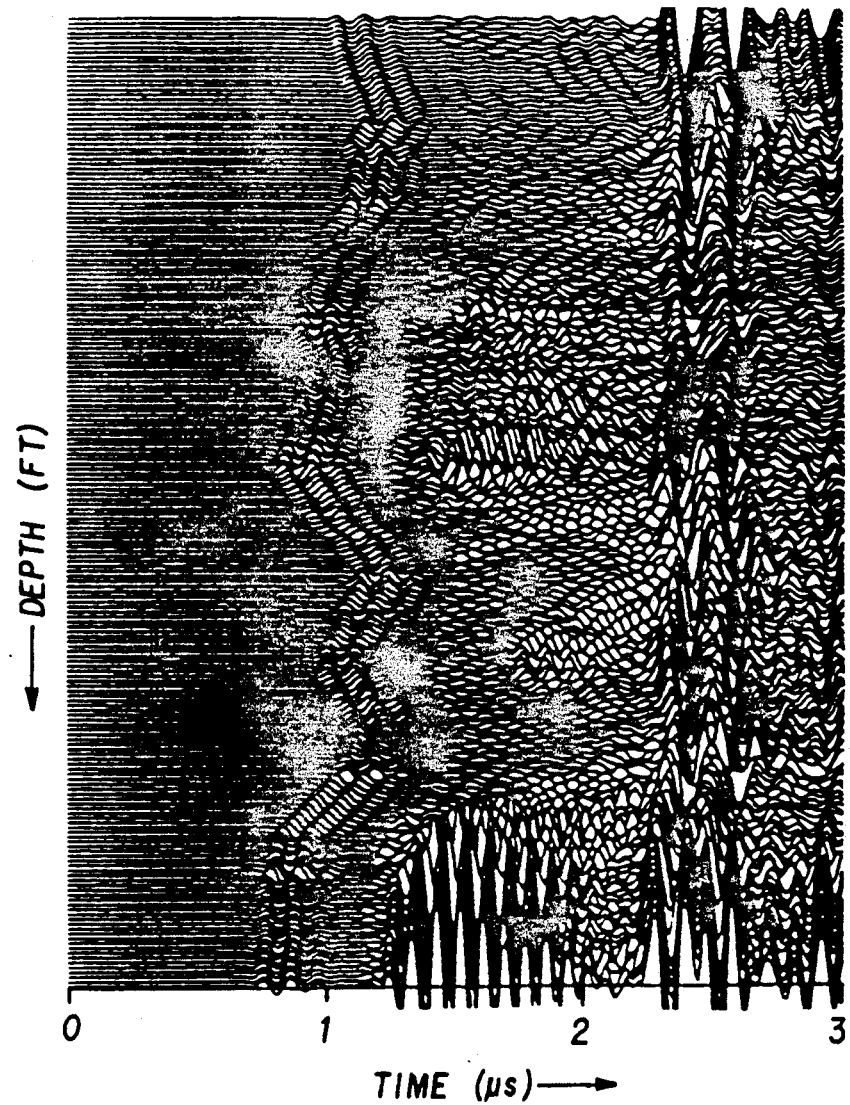
FIG. 6 shows the sonic data of FIG. 2 wherein the reflected wave components, converted wave components and/or noise, calculated from the first and second eigenvectors, are removed therefrom.

At step 312, the aligned waveforms are time shifted to return them to their original time positions, relative to each other. As shown with reference to FIG. 5, the waveforms are shown with the first residual removed, as a result of step 307. As shown with reference to FIG. 6, the waveforms are shown with the first and second residuals removed, as a result of step 309.

As set forth in step 313, in order to remove undesired wave components from the shear (S) and/or Stoneley (ST) wave components, steps 302 through 312 are repeated. It is to be understood that "S" and "ST" would replace the "P" term through out FIGS 3a and 3b.

Figure 7:
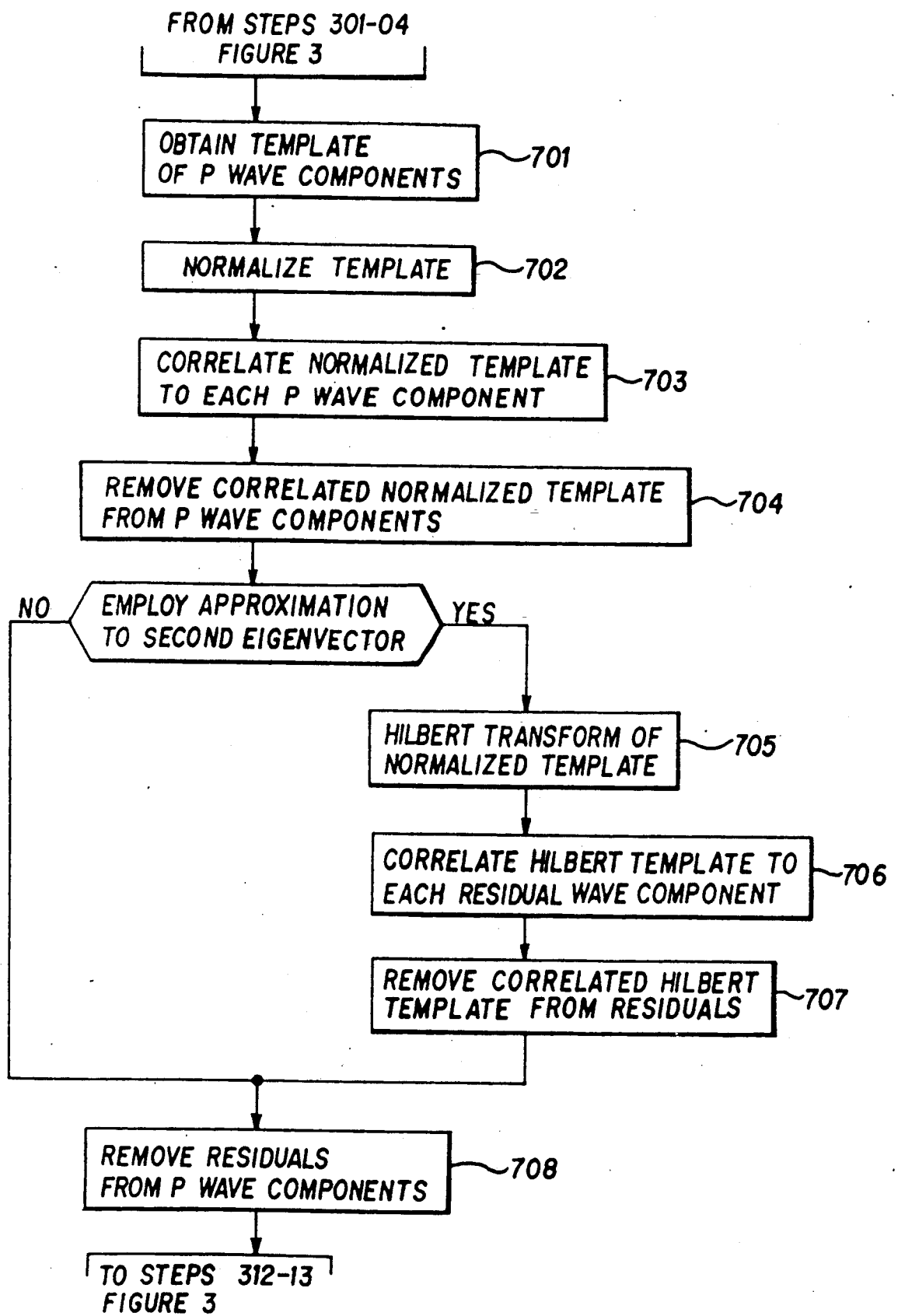
FIG. 7 illustrates a second embodiment of the present invention for substantially removing reflected wave components, converted wave components and/or noise from acquired sonic data employing an approximation of the Karhunen-Loeve transformation of FIG. 3.

Turning now to FIG. 7, a second embodiment of the method of the present invention for substantially removing reflected wave components, converted wave components and/or noise from acquired sonic data employing an approximation to the Karhunen-Loeve transfromation is described. In the second embodiment of the present invention, the first and second eigenvectors are approximated, thereby replacing steps 305 through 311 of the first embodiment, as shown in FIGS. 3a and 3b.

At step 701, a template of the P wave components is obtained. In the preferred embodiment, the template is obtained by stacking the P wave components. Stacking preferably involves cumulating corresponding waveform samples, located in the predetermined time window established at step 305, and dividing these cumulated samples by the number of waveforms cumulated.

The template of step 701 represents the average value at each sampled point without reflected wave components, converted wave components and noise therein. As reflected wave components, converted wave components and noise are mathematically random, these components statistically average out to zero. P waves, on the other hand, are coherent, thereby allowing the stacking procedure to produce non-zero results where non-zero P wave components are present.

It should be noted that the time window may, either by design or otherwise, contain a portion of the S wave component. Due to the fact that the S wave component arrival times vary according to formation type, the S wave components should not all line up when the P wave components are aligned (step 303). Thus, any S wave components captured by the time window should not be coherent and tend to average out to zero after stacking.

At step 702, the template is normalized. In the preferred embodiment, a normalization factor for the template is obtained by cumulating the square of each sample point in the template and then taking the square root of the cumulation. The normalization factor can be represented by the following equation:

$$N = \sqrt{\sum_{i=1}^{n} T(i)^2}$$

where
N represents the normalization factor;
T(i) represents the ith sample of the template; and
n represents the number of template samples.

The template is normalized by dividing each template point by the normalization factor.
The normalization of the template can be represented by the following equation:

$$T_N(i) = \frac{T(i)}{N} \text{ for } i = 1 \text{ to } n$$

where
$T_N(i)$ represents ith sample of the normalized template;
T(i) represents the ith sample of the template;
N represent the normalization factor; and
n represents the number of template samples.

The template represents the average P wave component for the m waveforms in the data set. The normalized template represents an approximation of the first eigenvector.

At step 703, the normalized template is correlated to each P wave component. In the preferred embodiment, a correlation factor for each P wave component is otained by taking the inner product of the normalized template and the respective P wave component. The inner product is preferably obtained by multiplying each normalized template sample with the corresponding P wave component sample and cumulating the results to obtain a scalar value. Obtaining the correlation factor of the normalized template to the P wave components can be represented by the following equation:

$$a_j = \sum_{i=1}^{n} T_N(i) S(i)_j \text{ for } j = 1 \text{ to } m$$

where
$a_j$ represents the correlation factor for the jth waveform;
$T_N(i)$ represents the ith sample of normalized template;
S(i) represents the ith sample of the jth P wave component;
n represents the number of samples; and
m represents the number of waveforms in the data set.

At step 704, the correlated template is removed from its respective P wave components, preferably by subtraction. In the preferred embodiment, the correlated template is obtained for each of the m waveforms by multiplying the normalized template by the correlation factor for the respective waveform. Removing the correlated template from the respective P wave component can be represented by the following equation:

$$S_R(i)_j = S(i)_j - a_j T_N(i) \text{ for } i = 1 \text{ to } n; j = 1 \text{ to } m$$

where
$S_R(i)_j$ represents the ith sample of the jth residual;
$S(i)_j$ represnets the ith sample of the jth P wave component;
$a_j$ represents the correlation factor for the jth wave component;
$T_N(i)$ represents the ith sample of the normalized template;
n represents the number of samples; and
m represents the number of waveforms in the data set.

Removing the normalized template from the respective P wave component yields a residual for each of the waveforms. The residual comprises reflected wave components, converted wave components and noise, as well as a residual P wave component.

As with the first eigenvector, the approximation to the first eigenvector also captures about 86% of the wave component. Should greater accuracy be desired, an approximation to the second eigenvector can empolyed, as set forth in steps 705 through 707. Otherwise, only step 708 is followed.

At step 705, an approximation to the second eigenvector is obtained. In the preferred embodiment, the approximation to the second eigenvector is obtained by taking the Hilbert transform of the normalized template. The Hilbert transform is well known in the art and need not be discussed in detail herein. As will be appreciated in the art, the Hilbert transform of the normalized template yields a normalized Hilbert template.

At step 706, the normalized Hilbert template is correlated to each residual wave component, preferably as discussed above with reference to step 703. Obtaining the correlation factor of the normalized Hilbert template to each residual P wave components can be represented by the following equation:

$$b_j = \sum_{i=1}^{n} T_H(i) S_R(i)_j \text{ for } j = 1 \text{ to } m$$

where
$b_j$ represents the correlation factor for the jth waveform;
$T_H(i)$ represents the ith sample of the Hilbert template;
$S_R(i)$ represents the ith sample of the jth residual wave component;
n represents the number of samples; and
m represents the number of waveforms in the data set.

At step 707, the correlated Hilbert template is removed from the residual wave components for which it was correlated, preferably as discussed above with reference to step 704. Removing the correlated Hilbert template from the respective residual wave components can be represented by the following equation:

$$S'_R(i)_j = S_R(i)_j - b_j T_H(i) \text{ for } i=1 \text{ to } n; j=1 \text{ to } m$$

where
$S'_R(i)_j$ represents the ith sample of the jth second residual;
$S_R(i)_j$ represents the ith sample of the jth first residual;
$b_j$ represents the Hilbert correlation factor for the jth wave component;
$T_H(i)$ represents the ith sample of the Hilbert template;
n represents the number of samples; and
m represents the number of waveforms in the data set.

At step 708, the residual wave components are removed from the aligned P were components, preferably by subtraction. In this case where only an approximation to the first eigenvector was employed (to step 704), the P wave components are about 86% free of undesired wave components. In this case, removing the residual wave components from the aligned P wave components for each waveform can be represented by the following equation:

$$S_c(i)_j = S(i)_j - S_R(i)_j \text{ for } i=1 \text{ to } n; j=1 \text{ to } m$$

where
$S_c(i)_j$ represents the ith sample of the jth wave component substantially free of reflected wave components, converted wave components and/or noise;
$S(i)_j$ represents the ith sample of the jth wave component;
$S_R(i)_j$ represents the ith sample of the jth first residual wave component;
n represents the number of samples; and
m represents the number of waveforms.

In the case where approximations to the first and second eigenvectors were empolyed (to step 707), the P wave components are about 92% free of undesired wave components. In this case, removing the residual wave components from the aligned P wave components for each waveform can be represented by the following equation:

$$S_c(i)_j = S(i)_j - S'_R(i)_j \text{ for } i=1 \text{ to } n; j=1 \text{ to } m$$

where
$S_c(i)_j$ represents the ith sample of the jth wave component substantially free of relfected wave components, converted wave components and/or noise;
$S(i)_j$ reprsents the ith sample of ith sample of the jth wave component;
$S'_R(i)_j$ represents the ith sample of the jth second residual wave component;
n represents the number of samples; and
m represents the number of waveforms.

Thereafter, the aligned waveforms are time shifted to return them to their original time positions (step 312) and/or the steps are repeated to remove reflected wave components, converted wave components and/or noise from the S and/or ST wave components (step 313).

In both the first and second embodiments, the time window for capturing the shear wave component is preferably at least as wide as for the P wave component. The time window for capturing the Stoneley wave component, on the other hand, is preferably at least as wide as from the Stoneley arrival to the end of the recorded waveform. As is known in the art, the Stoneley wave component is typically longer than the time for which the waveform is recorded. In the preferred embodiment, after the tool and casing arrivals have been filtered, it is preferable to filter the P wave component, the Stoneley wave component, and then the S wave component. The P is preferably first, due to its earliest arrival time, and the Stoneley is next, due to its dominant amplitude relative to the S wave component.

As is known in art, boreholes which are selected for production logging are typically lined with a casing and cemented in place in order to isolate zones in the formation. A good cement seal between casing and formation allows the casing and cement seal to be substantially transparent the tool's acoustic pulses. However, when the casing is poorly bonded to the formation, either due to an initially poor cementation job or through degradation over time, a portion of the tool's acoustic pulse is captured by the casing, resonating therein and detected by to the tool as casing arrivals. Casing arrivals, which typically appear before the P wave component, are recorded at substantially the same time over the course of the affected area.

Tool arrivals are the product of the acoustic wave traveling from the transmitter, through the tool, to the receiver(s). As the spacing between the transmitter and receiver reamins constant, tool arrivals are always recorded at substantially the same time, for a given transmitter-receiver pair, throughout the logging process.

Figure 8:
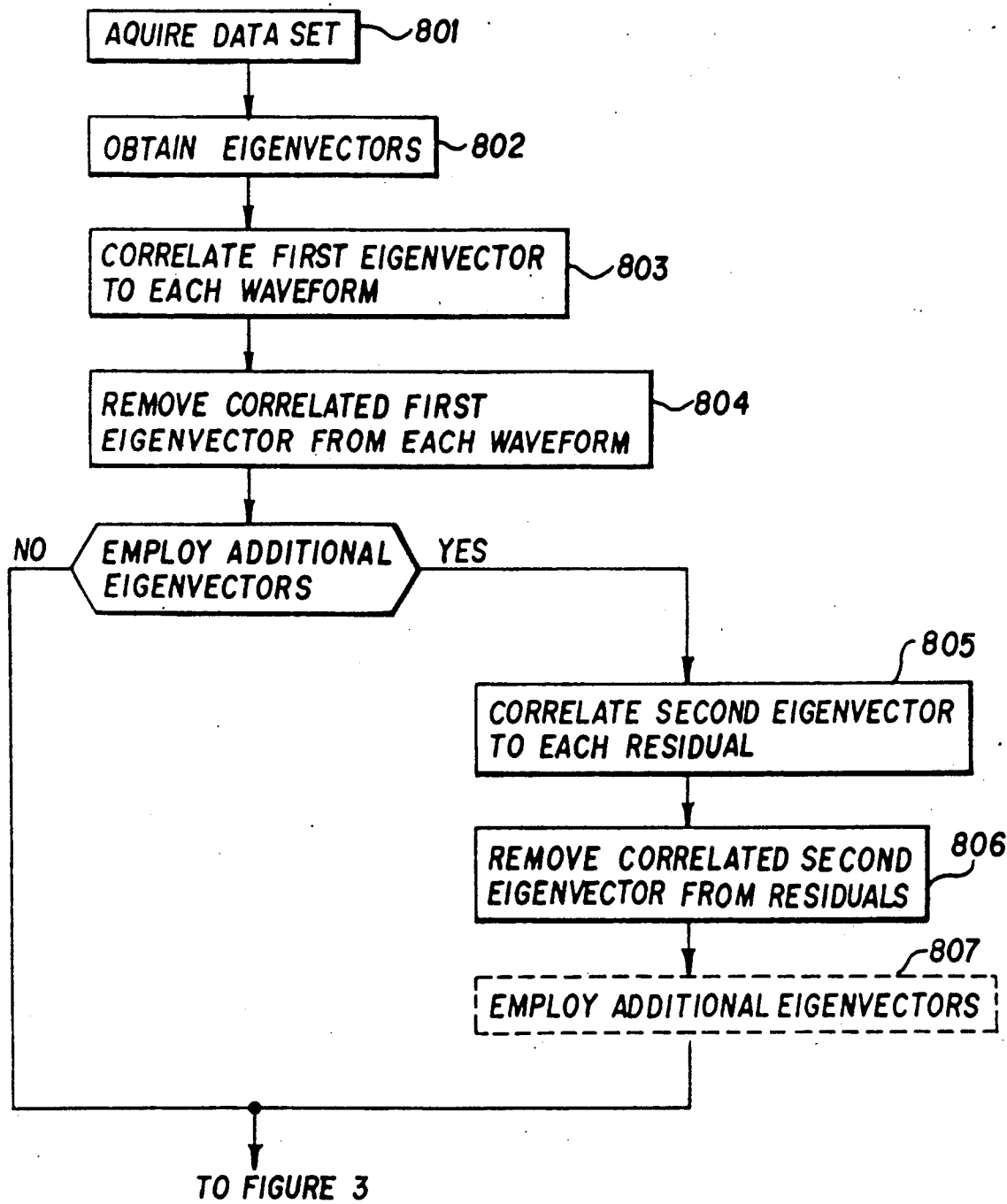
FIG. 8 illustrate a first embodiment of the present invention for substantially removing casing and tool arrivals from acquired sonic data employing a Karhunen-Loeve transformation.

Turning now to FIG. 8, a first embodiment of the present invention for substantially removing casing and tool arrivals is illustrated. After the data has been acquired at step 801, the first eigenvector is obtained at step 802 for the entire waveform, preferably as set forth at step 305. Due to the fact that the casing and tool arrivals appear at substantially the same time, it is not necessary to align the arrivals. Additionally, as the P, S and ST wave components will typically appear randomly relative to the casing and tool arrivals, it is not necessary to employ a time window.

At step 803, the first eigenvector is correlated to each waveform in the data set, thereby obaining a correlation factor for each waveform, preferably as set forth at step 306.

At step 804, a correlated first eigenvector is removed from its respective waveforms, preferably as set forth at step 307. Removing the correlated first eigenvector from each waveform yields a residual for each of the waveforms. The residual comprises reflected wave components, converted wave components and noise, as well as P, S and ST wave components. The residuals, however, do not contain an appreciable amount of casing or tool arrivals. However, should greater accuracy be desired, additional eigenvectors are empoyed, as set forth in steps 805 through 807.

At step 805, the second eigenvector is correlated to each residual waveform, preferably as discussed above with reference to step 306.

At step 806, the correlated second eigenvector is removed from its respective residual waveforms, preferably as discussed above with reference to step 309.

Additional eigenvectors may be employed at step 807, preferably as set forth at step 310. Thereafter, the residual waveform contains the P, S and ST wave components substantially free of casing and tool arrivals, and the reflected wave components, converted wave components and/or noise may be removed as explained above with reference to FIGS. 3 and/or 7.

Figure 9:
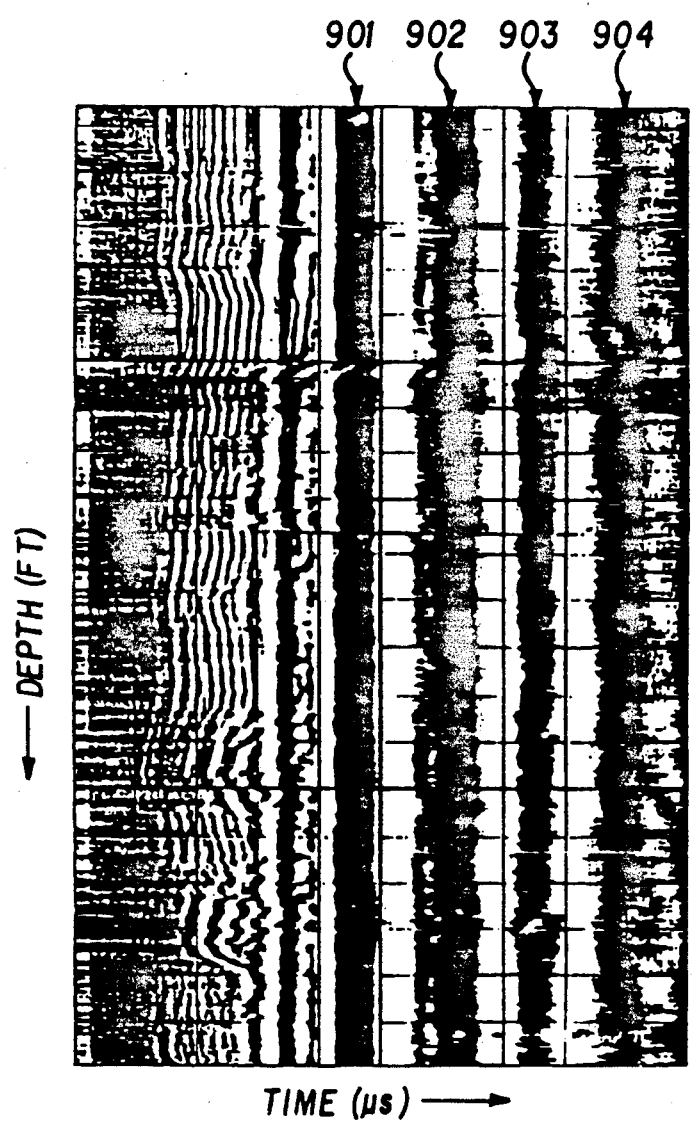
FIG. 9 illustrates an acquired sonic data set having multiple tool arrivals.
Figure 10:
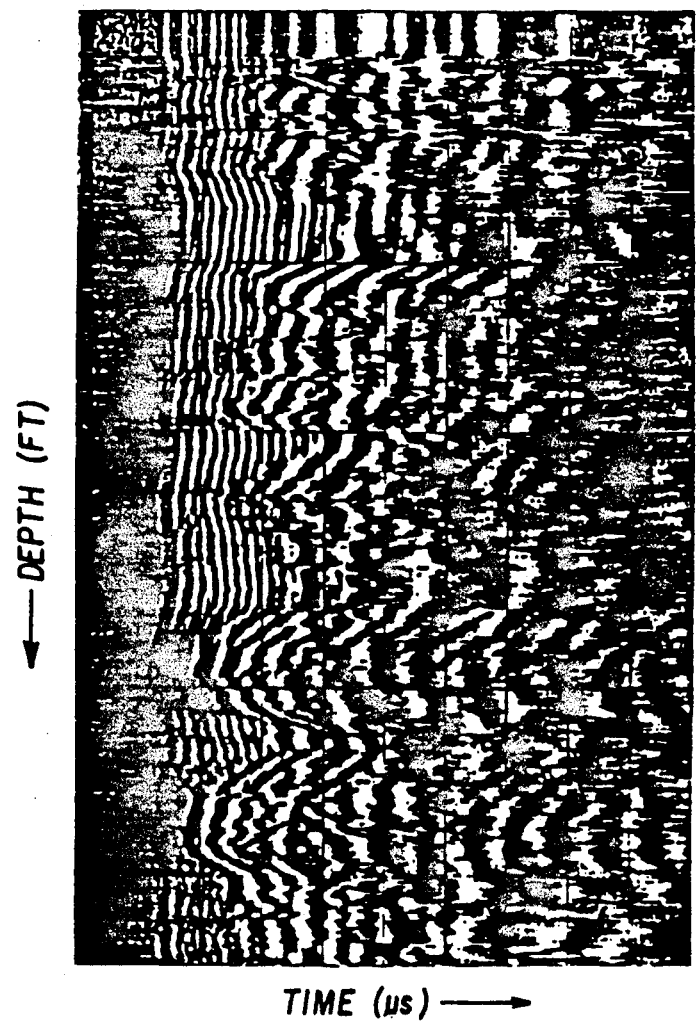
FIG. 10 illustrates the data set of FIG. 9 with the tool arrivals removed therefrom.

With reference to FIG. 9, an acquired sonic data set is illustrated having tool arrivals 901 through 904 which substantially mask the shear wave components. Employing the first eigenvector and the method discussed above, the tool arrivals are removed, allowing the shear waves to be more readily illustrated, as shown with reference to FIG. 10.

Alternatively, in a second embodiment of the present invention for substantially removing casing and tool arrivals, approximations to the first and second eigenvectors may be employed. Thus, steps 802 through 807 would be replaced with steps 701 through 707.

In the preferred embodiment, two eigenvectors, or their approximations, are employed for removing casing arrivals, while one eigenvector, or its approximation, is preferably employed for removing tool arrivals.

In another embodiment of the present invention, the reflection coefficient of a bed boundary in the formation can be estimated for each wave component. The reflection coefficient is estimated by dividing the energy content of the reflected wave component, obtained from the residual waveform, by the energy content of the transmitted wave component, obtained from the filtered wave component. In the preferred embodiment, the energy content of the reflected and converted wave components are calculated by cumulating the square the amplitude of each sample. Other mathods of calculating the energy content of the reflected and transmitted wave components are well known to those skilled in the art and can be empolyed in the alternative.

The method of the present invention for estimating a reflection coefficient of a bed boundary in the formation represents an alternative to methods known in the art. The prior art calculated the reflection coefficient according to the following equation:

$$\frac{\rho_2 v_2 - \rho_1 v_1}{\rho_2 v_2 + \rho_1 v_1}$$

where
the transmitted wave travels through layer 1 and is reflected by layer 2;
$v_i$ represents the velocity of the respective layers; and
$\rho$ represents the density of the respective layers.

The velocity and density measurements of the layers were typically acquired in the prior art from a sonic and density log, respectively. Thus, both a sonic and a density logging tool have to be employed. The above method of the present invention for estimating a reflection coefficient based on trasmitted and reflected wave components requires only the use of a sonic tool. Thus, substantial savings of both time and money will be realized by employing this method of the present invention.

In yet another embodiment of the present invention, the lithology of the formation traversing the borehole can be identified. Acoustic pulses which travel through like media tend to exhibit like characteristics. I have found that plotting wave components based on their projection on the eigenvectors results in a cluster of wave components based on the media through which they traveled. As an example, FIG. 11 shows a plurality of P wave components plotted in a two-dimensional plane. The abscissa (x-axis) is the projection of the P wave component on the first eigenvector, or its approximation, while the ordinate (y-axis) is the projection of the P wave component on the second eigenvector, or its approximation.

It turns out that these points tend to cluster based on lithology type. For example, points obtained from wave components traveling through limestone tend to congregate in one area of the plane, while points obtained from wave components traveling through shaley sand tend to congregate in another area. FIG. 11 identifies four types of lithologies, e.g., shale, limestone and two different sand types, using the projection of the P wave component on the first and second eigenvectors for the acquired sonic data of FIG. 2.

The projection on the first eigenvector is the factor $a_j$, calculated at step 306 or 703, correlating the P wave component to the first eigenvector or its approximation, respectively. The projection on the second eigenvector is the factor $b_j$, calculated at step 308 or 706, correlating the P wave component to the second eigenvector or its approximation, respectively.

Given a plurality of wave components depicted in this manner, a database can be established to identify the lithology of the formation traversing the borehole given its coordinates in a plane whose axes are the component's projections on their eigenvectors.

It is noted that, while general lithology can be identified using the projection of the respective P wave components on the first eigenvector, more specific lithology can be identified using the projection of the respective P wave component on the second eigenvector. It is further noted that the database could be any dimension, up to the n-dimensional space, based on the n samples of the wave component.

It is noted that any combination of wave components and/or eigenvectors may be employed in establishing the database. For example, the same wave component may be employed with its projections on different eigenvectors (as discussed above), different wave components may be employed with their respective projections on the same eigenvector, or different wave components may be employed with their respective projections on different eigenvectors.

In still another embodiment of the present invention, data compression can be accomplished using the eigenvectors as calculated above. Recalling that Karhunen-Loeve rotates the n-dimensional coordinate system to a new coordinate system, the wave component vectors can substantially be expressed in terms of their primary eigenvectors. For example, if the 4th through 50th eigenvalues are substantially equal to zero, each wave component vector can substantially be described using only their projection on the first three eigenvectors.

Assuming the wave component vectors can substantially be described using the first three eigenvectors, reconstruciton factors $A_1$, $A_2$ and $A_3$ are defined as follows:

$$A_j = E_1^T S_j$$

$$B_j = E_2^T S_j$$

$$C_j = E_3^T S_j$$

where
$A_j$ represents a scalar reconstruction factor for the 1st eigenvector, jth waveform;
$B_j$ represents a scalar reconstruciton factor for the 2nd eigenvector, jth waveform;
$C_j$ represents a scalar reconstruction factor for the 3rd eigenvector, jth waveform;
$E_i^T$ represents the transpose of the ith eigenvector; and $S_j$ represents the jth wave component vector.

It is noted that $A_j$, $B_j$ and $C_j$ are the vectors obtained from correlating the first, second and third eigenvector to the individual wave components, respectively, i.e., the vector obtained from the individual $a_j$'s, $b_j$'s and $c_j$'s calculated as set forth at steps 306, 308 and 310, respectively.

The three scalar reconstruction factors are retained for each wave component vector, as well as the three eigenvectors. For illustrattive purpose, assume each wave component vector has 50 samples and the data set has 10,000 waveforms. Without compression, the data set would require 1500 k values for storage (50 samples per wave component *3 wave components per waveform *10 k waveforms). By the data compression method herein described, only 90.45 k values are required (3 wave components per waveform *3 reconstruction factors per wave component *10 k waveforms +3 wave components per waveform *3 eigenvectors per wave component *50 samples per eigenvector). The compression ratio of the present invention is thus about 17 to 1.

In order to reconstruct the original wave components, the following equation is preferably employed:

$$S_j = A_j E_1 + B_j E_2 + C_j E_3 \text{ for } j=1 \text{ to } m$$

The above techniques have been described in detail with reference to sonic data acquired with one transmitter and one receiver. These techniques are also applicable to sonic data acquired by an array sonic tool, having at least one transmitter and a plurality of receivers, as well as a borehole compensation tool, having at least two transmitters and at least two receivers. Such tool configurations are well known and need not be described in detail herein.

Although illustrative embodiments of the present invention have been described in detail with reference to the accompanying drawings, it is to be understood that the invention is not limited to those precise embodiments. Various changes or modifications may be effected therein by one skilled in the art without departing from the scope or spirit of the invention.

What I claim as my invention is:

1. A method of identifying lithology of a formation traversed by a borehole from which sonic data was acquired, the sonic data comprising a data set of m waveforms, each of the waveforms including a formation wave component digitized into n samples, said formation wave component comprising at least direct wave components, said lithology identification method comprising the steps of:

for a plurality of m waveforms characterizing the n samples of each formation wave component as a vector, thereby obtaining a plurality of formation wave component vectors;

obtaining a first eigenvector based on said formation wave component vectors;

selecting a first formation wave component vector of said plurality of formation wave component vectors;

calculating a projection of said first wave component vector on said first eigenvector; and identifying the lithology of the formation through which the wave component characterized by said first formation wave component vector passed based on said projection of said first wave component vector on said first eigenvector.

2. The method of claim 1, wherein said step of obtaining a first eigenvector includes the steps of:

transposing each of said formation wave component vectors;

obtaining a correlation matrix based on said formation wave component vectors and said transpose thereof; and obtaining said first eigenvector based on said correlation matrix.

3. The method of claim 2, wherein said correlation matrix is based on the following equation:

$$CM = \frac{1}{m} \left( \sum_{j=1}^{m} S_j S_j^T \right)$$

where $S_j$ represents the digitized formation wave component vector for the jth waveform; and $S_j^T$ represents the transpose of the formation wave component vector for the jth waveform.

4. The method of claim 1, said step of calculating a projection of said first wave component vector on said first eigenvector is based on the following equation:

$$a = \sum_{i=1}^{n} E_1(i) S(i)$$

where a represents the projection of said first wave component vector on said first eigenvector;

$E_1(i)$ represents said first eigenvector; and

S(i) represents said first wave component vector.

5. The method of claim 1, said method further comprising the steps of:

obtaining a second eigenvector based on said formation wave component vectors;

calculating a projection of said first wave component vector on said second eigenvector; and identifying the lithology of the formation through which said first wave component passed further based on said projection of said first wave component vector on said second eigenvector.

6. The method of claim 5, wherein said step of obtaining a second eigenvector includes the steps of:

transposing each of said formation wave component vectors;

obtaining a correlation matrix based on said formation wave component vectors and said transpose thereof; and obtaining a second eigenvector based on said correlation matrix.

7. The method of claim 6, wherein said correlation matrix is based on the following equation:

$$CM = \frac{1}{m} \left( \sum_{j=1}^{m} S_j S_j^T \right)$$

where $S_j$ represents the digitized formation wave component vector for the jth waveform; and $S_j^T$ represents the transpose of the formation wave component vector for the jth waveform.

8. The method of claim 5, said step of calculating a projection of said first wave component vector on said second eigenvector is based on the following equation:

$$b = \sum_{i=1}^{n} E_2(i)S(i)$$

where
- b represents the projection of said first wave component vector on said second eigenvector;
- $E_1(i)$ represents said second eigenvector; and
- S(i) represents said first wave component vector.

9. The method of claim 5, said method further comprising the steps of:
- obtaining at least one additional eigenvector based on said formation wave component vectors;
- calculating a projection of said first wave component vector on each of said at least one additional eigenvectors; and
- identifying the lithology of the formation through which said first wave component passed further based on said projection of said first wave component vector on said at least one additional eigenvector.

10. The method of claim 5, further comprising the steps of:
- selecting at least one second formation wave component vector from said plurality of formation wave component vectors;
- calculating a projection of said at least one second formation wave component vector on said first and second eigenvectors; and
- identifying the lithology of the formation through which the wave component characterized by said first and second formation wave component vectors passed further based on said projections of said second wave component vector on said first and second eigenvectors.

11. The method of claim 1, further comprising the steps of:
- selecting at least one second formation wave component vector from said plurality of formation wave component vectors;
- calculating a projection of said as least one second formation wave component vector on said first eigenvector; and
- identifying the lithology of the formation through which the wave component characterized by said second formation wave component vector passed further based on said projection of said second wave component vector on said first eigenvector.

12. The method of claim 1, wherein:
said formation wave component further comprises at least one of reflected wave components, converted wave components and noise.

13. The method of claim 1, wherein:
said formation wave component is selected from a group consisting of a compressional wave component, a shear wave component, and a Stoneley wave component.

14. A method of identifying lithology of a formation traversed by a borehole from which sonic data was acquired, the sonic data comprising a data set of m waveforms, each of the waveforms including a formation wave component digitized into n samples, said formation wave component comprising at least direct wave components, said lithology identification method comprising the steps of:

stacking the digitized formation wave components, thereby obtaining a template of the formation wave components;
normalizing said template, thereby obtaining an average value of said formation wave components;
selecting a first formation wave component;
obtaining a first correlation factor by correlating said normalized template to said first formation wave component; and
identifying the lithology of the formation through which said first wave component passed based on said first correlation factor.

15. The method of step 14, said step of normalizing said template comprising the steps of:
- cumulating the square of each template sample;
- obtaining the square root of said cumulation, thereby obtaining a normalization factor; and
- dividing each of said template samples by said normalization factor, thereby normalizing said template.

16. The method of claim 14, said step of obtaining a first correlation factor is based on the following equation:

$$a = \sum_{i=1}^{n} T_N(i)S(i)$$

where
- a represents said first correlation factor;
- $T_N(i)$ represents the ith sample of said normalized template; and
- S(i) represents the ith sample of said first wave component vector.

17. The method of claim 14, said method further comprising the steps of:
- calculating a Hilbert transform of said normalized template, thereby obtaining a Hilbert template, said Hilbert template having n samples;
- obtaining a second correlation factor by correlating said Hilbert template to said first formation wave component; and
- identifying the lithology of the formation through which said first wave component passed further based on said second factor.

18. The method of claim 17, said step of obtaining a second correlation factor is based on the following equation:

$$b = \sum_{i=1}^{n} T_H(i)S(i)$$

where
- b represents said first correlation factor;
- $T_H(i)$ represents the ith sample of said Hilbert template; and
- S(i) represents the ith sample of said first wave component vector.

19. The method of claim 14, wherein:
said formation wave component further comprises at least one of reflected wave components, converted wave components and noise.

20. The method of claim 14, wherein:
said formation wave component is selected from a group consisting of a compressional wave component, a shear wave component, and a Stoneley wave component.

* * * * *